Jan. 20, 1959
L. H. ROWLEY
2,870,417
MAGNETIC AMPLIFIER CIRCUIT
Filed Oct. 28, 1957
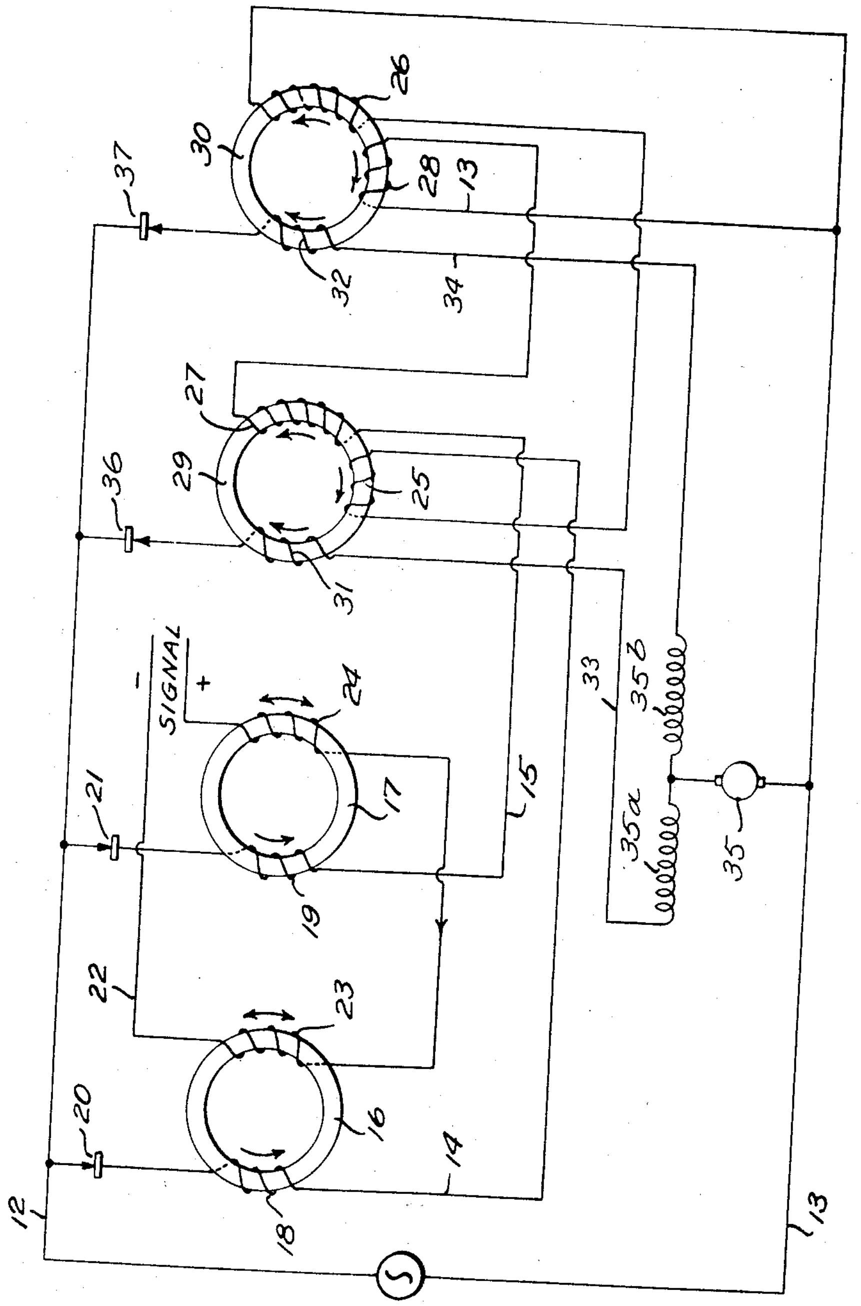
INVENTOR.
LOTHAIR H. ROWLEY
BY Victor D. Borst
ATTORNEY 2,870,417

MAGNETIC AMPLIFIER CIRCUIT

Lothair H. Rowley, Syosset, N. Y., assignor to Ford Instrument Company, Division of Sperry-Rand Corporation, Long Island City, N. Y., a corporation of Delaware Application October 28, 1957, Serial No. 692,716

3 Claims. (Cl. 323—89)

This invention relates to electrical amplifier circuits employing magnetic amplifiers of the saturable core reactor type, and particularly to multistage systems of this type in which the output of one stage is utilized to control the output of the next succeeding stage.

More particularly, the invention relates to circuits in which the outputs are rectified by half-wave rectifiers and control windings on the saturable cores differentially control the saturation of the two cores of each stage. Succeeding stages are oppositely poled with the result that the control is effected by one stage on the off half-cycle of the next succeeding or controlled stage.

Such circuits are adapted for amplifying weak input currents for low impedance loads and such weak input current, which is commonly referred to as the signal current, is the control current for the first stage, oppositely affecting the reactance of two output load windings. These outputs in turn oppositely affect the reactance of the load windings in the next stage.

In such systems, it is desirable to precondition the succeeding or controlled reactors, thereby predetermining the normal degree of saturation as a reference or starting flux level from which the control operates, whereby the phase of the output current is sensitive to variations in the control current from a predetermined value. As will appear, the sensitivity is in opposite directions from the predetermined value. This preconditioning is known as biasing in the art and is variously effected, either out of phase or in phase with the signal control.

Commonly separate bias windings are employed. It is an object of this invention to provide a circuit in which the same windings serve for biasing and for control.

Another object is to provide a system which will be accurate and sensitive in its response to the signal current. Other objects and advantages of the invention will appear from the following description.

The invention contemplates the use of two windings for control purpose on each magnetic core after the first stage which are so wound, and connected into their circuits as to be opposed in flux inducing sense, one being positive and the other negative with respect to the load winding. The windings on the two cores are cross connected, that is, the negative winding on each core is connected with the positive winding on the other core. Each pair of these connected windings is connected in series circuit with one of the load windings of the preceding stage.

Among other advantages of this cross connection of windings of opposing sense is the fact that by making them of a different number of turns they serve as bias windings when there is no signal.

The invention will now be described by reference to the embodiment of the invention diagrammatically illustrated in the accompanying drawing which schematically illustrates an amplifier circuit embodying the essential features of the invention.

A source of A.-C. voltage is connected to the lines 12 and 13 across which are connected two control circuits 14 and 15 in parallel. A pair of ring cores 16 and 17 provide closed magnetic circuits on which load windings 18 and 19, respectively, are wound. The load windings 18 and 19 are in control circuits 14 and 15, respectively, which are poled to carry current in one direction by half-wave rectifiers 20 and 21, respectively.

A signal circuit 22 includes two series windings 23 and 24 on the cores 16 and 17, respectively, which are wound in opposition to each other so that they induce flux in opposite direction and have a push-pull effect on their respective cores.

The control circuit 14 includes in series two control windings 25 and 26, and control circuit 15 includes in series two control windings 27 and 28. The windings 25 and 27 are disposed on load core 29 and windings 26 and 28 are disposed on load core 30.

Also disposed on cores 29 and 30 are load windings 31 and 32, respectively, which are in parallel branch circuits 33 and 34, respectively connected across the line through split field winding having halves 35*a* and 35*b*, the center tap of which is connected to one brush of D.-C. motor armature 35, the other brush being connected to the line 13. Load winding 31 is connected to line 12 by half-wave rectifier 36 and load winding 32 is connected to line 12 by half-wave rectifier 37. Rectifiers 36 and 37 are poled oppositely to rectifiers 20 and 21 so that the load and control currents in the second stage occur on alternate half cycles.

As shown and as indicated by arrows, load windings 31 and 32 are wound and connected to induce flux in a clockwise direction as are windings 25 and 28, while windings 26 and 27 are wound and connected to induce flux in a counterclockwise direction.

When the flux levels in the cores 29 and 30 are changed by the flux induced by the control windings 25, 26, 27 and 28, a voltage difference is placed on the split phase winding 35*a*, 35*b* and the motor output corresponds to the strength of the signal.

If the signal polarity is such as to decrease the impedance of winding 18 and increase the impedance of winding 19, the current in control circuit 14 will dominate and the impedance of winding 31 will be less than that of winding 32 with the result that the voltage on field winding 35*a* will exceed that on windings 35*b*. The opposite signal polarity will, of course, reverse the voltage applied to windings 35*a* and 35*b*. In other words, the polarity of the signal determines the polarity of the field winding of the motor and hence the direction of operation of the motor.

As shown, the two control windings on each second stage core differ in the number of turns, those in the positive windings 25 and 28 being the same and half those in the negative windings 26 and 27. It is this difference in the number of turns which enables the control windings of circuits 14 and 15 to serve as bias windings when there is no signal.

Under no signal condition, a certain current flows in control circuits 14 and 15 during the active half cycle which is equal in the two control circuits. Since the number of turns in the negative windings 26 and 27 is the greater, it follows that the negative flux induced in the cores 29 and 30 is greater than the positive flux induced by windings 25 and 28. Consequently, on zero signal there is a negative biasing of the second stage reactors. It is obvious that the degree and nature of the biasing are dependent upon the relative number of turns in the positive and negative control windings on each core.

In practice, the number of turns may be made adjustable. It is apparent that if no bias were required and the number of turns in the two windings on each core were made the same they would still function as control windings since the current in one would predominate over that in the other winding on the same core under condition of a signal. This difference would, of course, be of opposite polarity in the two reactors due to the cross connection.

It is also apparent that the net differential in the opposing control flux in the two cores, when, as shown, there is a substantial difference in the number of turns, is greater than is the case of a single winding on each core. In the circuit shown, for example, the increase in negative control current is relatively large in the reactor of increased impedance and is relatively small in the reactor of decreased impedance. The system is, therefore, sensitive in its response to changes in signal current.

It will be understood that the system illustrated and described above is representative of the invention, and that the invention may be otherwise embodied within the scope of the following claims.

What is claimed is:

1. A magnetic amplifier circuit comprising a pair of closed magnetic circuits, a load winding on each magnetic circuit, a source of alternating current, the load windings being connected across the alternating current line in parallel branches, a half-wave rectifier in each branch circuit, the two rectifiers being poled in the same direction, a signal circuit having windings inductively related to the two magnetic circuits and arranged in opposing relation to the responsive load windings, a second pair of closed magnetic circuits, a pair of control windings on each of said second pair of closed magnetic circuits, one of the windings of each pair having a relatively greater number of turns than the other winding of the pair, one of the said load windings being connected in series in its parallel branch with the control windings on one of the second pair of closed magnetic circuits having the lesser number of turns and with the control winding on the other of the second pair of closed magnetic circuits having the greater number of turns and the other of said load windings being connected in series in its parallel branch with the control winding on the said one of the second pair of closed magnetic circuits having the greater number of turns and with the control winding on the other of the second pair of closed magnetic circuits having the lesser number of turns, the control windings of each pair being connected in their respective circuits in opposing flux inducing sense, a load winding on each of said second pair of closed magnetic circuits, the two last mentioned load windings being connected across the alternating current line in parallel branches, and half-wave rectifiers in the last mentioned parallel branches poled oppositely to the first mentioned rectifiers.

2. A magnetic amplifier circuit as defined in claim 1 in which the control windings of the larger number of turns of each pair is connected into its circuit in flux inducing opposition to the load winding on its closed magnetic circuit.

3. A magnetic amplifier circuit as defined in claim 1 in which the number of turns in the control windings of the two pairs having the larger number of turns is substantially the same and the number of turns in the control-windings of the said pairs having the lesser number of turns is substantially the same.

References Cited in the file of this patent

UNITED STATES PATENTS 2,725,521 Geyger -------------- Nov. 29, 1955